United States Patent [19]

Popek

[11] Patent Number: 5,242,194
[45] Date of Patent: Sep. 7, 1993

[54] AIR BAG INFLATOR

[75] Inventor: Joseph C. Popek, Detroit, Mich.

[73] Assignee: TRW Vehicle Safety Systems Inc., Lyndhurst, Ohio

[21] Appl. No.: 965,356

[22] Filed: Oct. 23, 1992

[51] Int. Cl.⁵ .............................................. B60R 21/26
[52] U.S. Cl. ......................................... 280/737; 222/5; 137/68.2
[58] Field of Search ...................... 280/737, 741, 736; 222/5, 3; 137/68.2

[56] References Cited

U.S. PATENT DOCUMENTS

| | | | |
|---|---|---|---|
| 3,773,353 | 11/1973 | Trowbridge et al. | 280/737 |
| 3,774,807 | 11/1973 | Keathley et al. | 222/3 |
| 3,966,226 | 6/1976 | Roth | 280/737 |
| 3,968,980 | 7/1976 | Hay | 280/737 X |
| 5,131,680 | 7/1992 | Coultas et al. | 280/741 X |
| 5,152,550 | 10/1992 | Hoagland et al. | 280/737 |

FOREIGN PATENT DOCUMENTS

| | | | |
|---|---|---|---|
| 0571399 | 2/1959 | Canada | 137/68.2 |
| 0966529 | 4/1975 | Canada | 280/737 |
| 2211355 | 5/1973 | Fed. Rep. of Germany | 280/737 |
| 2443267 | 3/1975 | Fed. Rep. of Germany | 280/741 |

Primary Examiner—Margaret A. Focarino
Assistant Examiner—Peter C. English
Attorney, Agent, or Firm—Tarolli, Sundheim & Covell

[57] ABSTRACT

An inflator comprises a source of gas for inflating on inflatable vehicle occupant restraint, such as an air bag. The air bag, when inflated, restrains an occupant of a vehicle during a collision. A burst disk is located to block gas flow into the air bag. A piston is movable from a retracted position to an extended position to rupture the burst disk. The piston includes (i) a first central portion for puncturing the burst disk and (ii) a second portion for cutting out a portion of the burst disk after the first central portion punctures the burst disk. After the second portion of the piston cuts out a portion of the burst disk, the cut out portion of the burst disk is clamped between the piston and a housing part of the inflator.

11 Claims, 5 Drawing Sheets

AIR BAG INFLATOR

TECHNICAL FIELD

The present invention relates to an inflator for use in inflating a vehicle occupant restraint such as an air bag.

BACKGROUND ART

A typical air bag inflator includes a rupturable burst disk which, when ruptured, releases a flow of gas from a container in which gas is stored to an air bag to inflate the air bag. The burst disk ruptures in response to a vehicle collision. In known inflators which include a rupturable burst disk, the opening created by the ruptured burst disk is a factor in determining the rate of gas flow into the air bag. It is important, therefore, to have the burnt disk reliably rupture to create an opening with an effective flow area in a predetermined range of areas.

SUMMARY OF THE INVENTION

In accordance with the present invention, an inflator for inflating an inflatable vehicle occupant restraint comprises a source of gas for inflating the occupant restraint. A burst disk is located to block gas flow into the occupant restraint. A piston is provided for rupturing the burst disk. The piston is movable from a retracted position to an extended position to rupture the burst disk. The piston includes (i) a first central portion for puncturing the burst disk and (ii) a second portion for cutting out a portion of the burst disk after the first central portion punctures the burst disk. The portion of the burst disk cut by the second portion of the piston has an annular shape. The annular-shaped cut portion of the burst disk is clamped between the piston and a housing part of the inflator.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT OF THE INVENTION

General Description

An inflator assembly 10 (FIG. 1) inflates a vehicle occupant restraint, such as an air bag. The inflator assembly 10 includes a generally cylindrical container 12, a generally cylindrical diffuser 14, and a manifold assembly 16. The manifold assembly 16 is secured to one end of the container 12 by a friction weld 18 and projects both axially into and axially away from the container. The diffuser 14 is larger in diameter than the container 12 and is mounted to encircle both the container and the manifold assembly. The diffuser 14 also extends substantially the entire length of the manifold assembly 16 and a significant portion of the length of the container 12.

Figure 1:
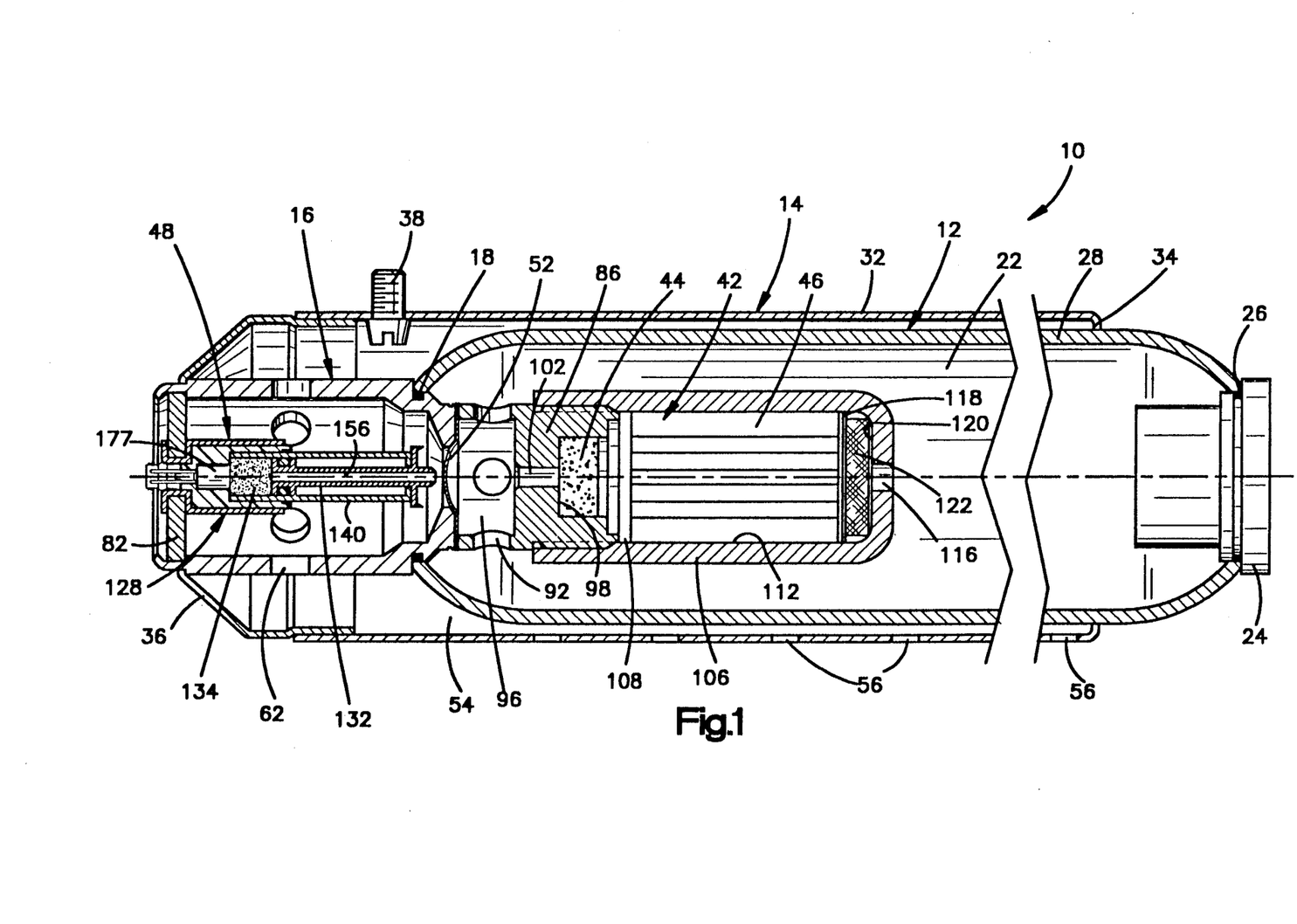
FIG. 1 is a sectional view of an inflator incorporating an apparatus constructed in accordance with the present invention.

The container 12 defines a generally cylindrical chamber 22. The chamber 22 is filled with gas under pressure which is introduced into the chamber through an end cap 24. The end cap 24 extends through an opening at an end of the container 12 opposite from the manifold assembly 16 and is connected to the container 12 by a friction weld 26. The end cap 24 includes a passage (not shown) through which the gas is conducted into the chamber 22. Once the chamber 22 has been filled with gas at a desired pressure, the passage is closed. The end cap 24 also includes a conventional pressure switch (not shown) from which gas pressure in the chamber 22 can be monitored to alert a passenger in a vehicle if the pressure in the chamber 22 drops below a set pressure.

The stored gas is preferably argon. The argon gas is preferably stored in the container 12 at a pressure of approximately 2,000 to 3,500 psi. The container 12 could, however, store other gases at different pressures. For example, the container 12 could store air or nitrogen.

The container 12 includes a generally cylindrical one-piece steel wall 28 which defines the chamber 22. The one-piece steel wall 28 may have a length of approximately 230 millimeters, an outside diameter of approximately 59 millimeters, and a thickness of approximately 2.5 millimeters. It should be understood that the foregoing specific dimensions for the wall 28 have been set forth herein for purposes of clarity of description only. It is contemplated that the inflator assembly 10 may be constructed with dimensions and materials which are substantially different from the foregoing.

The diffuser 14 is mounted o the outside of the container 12. The diffuser 14 includes a cylindrical diffuser tube 32 having an annular, radially inwardly directed lip 34 at one end. The lip 34 tightly engages a cylindrical outer side surface of the wall 28. An end cap 36 is welded to the end of the diffuser tube 32 opposite from the inturned lip 34. The end cap 36 is connected to an outer end portion of the manifold assembly 16. A mounting stud 38 is connected with the diffuser tube 32 adjacent the end cap 36. The mounting stud 38 is used to mount the inflator assembly 10 to a reaction can which can be mounted at a desired location in vehicle.

The manifold assembly 16 extends through the wall 28 of the container 12 at the end of the container opposite the end cap 24. The portion of the manifold assembly 16 within the container 12 supports ignitable pyrotechnic material 42. In the embodiment of the invention illustrated in FIG. 1, the ignitable pyrotechnic material 42 includes a booster charge 44 and a body 46 of pyrotechnic material. The portion of the manifold assembly 16 outside the container 12 supports an actuator assembly 48. Between the actuator assembly 48 and the booster charge 44 is a metal burst disk 52 which seals the container 12.

Upon the sensing of sudden vehicle deceleration, the actuator assembly 48 is actuated to release the stored gas from the chamber 22 and to ignite the booster charge 44 and the body 46 of pyrotechnic material. When actuated, the actuator assembly 48 ruptures the metal burst disk 52 to release the stored gas from the chamber 22. Thereafter, the actuator assembly 48 ignites the booster material 44, which in turn ignites the body 46 of pyrotechnic material. As the body 46 of pyrotechnic material burns, the gas in the chamber 22 is heated and added to by the hot gases produced by the combustion of the body 46 of pyrotechnic material, thereby increasing the pressure of the gas.

Upon rupturing of the burst disk 52, gas flows from the chamber 22 through the manifold assembly 16. The gas flows from the manifold assembly 16 into a chamber 54 formed by the diffuser 14 and the outer walls of the manifold assembly and the container 12. The diffuser 14 has openings 56 through which gas is directed to the air bag.

Manifold Assembly

The manifold assembly 16 (FIG. 2) includes a generally cylindrical metal manifold plug 58 which is disposed partially outside of the container 12. The manifold plug 58 is hollow and has a generally cylindrical interior cavity 60. Circular outlet openings 62 are disposed in a circular array in a cylindrical side wall 64 of the manifold plug 58. One end of the manifold plug 58 extends through the container wall 28 from outside of the container 12 and is friction welded to the wall 28 at the weld 18.

Figure 2:
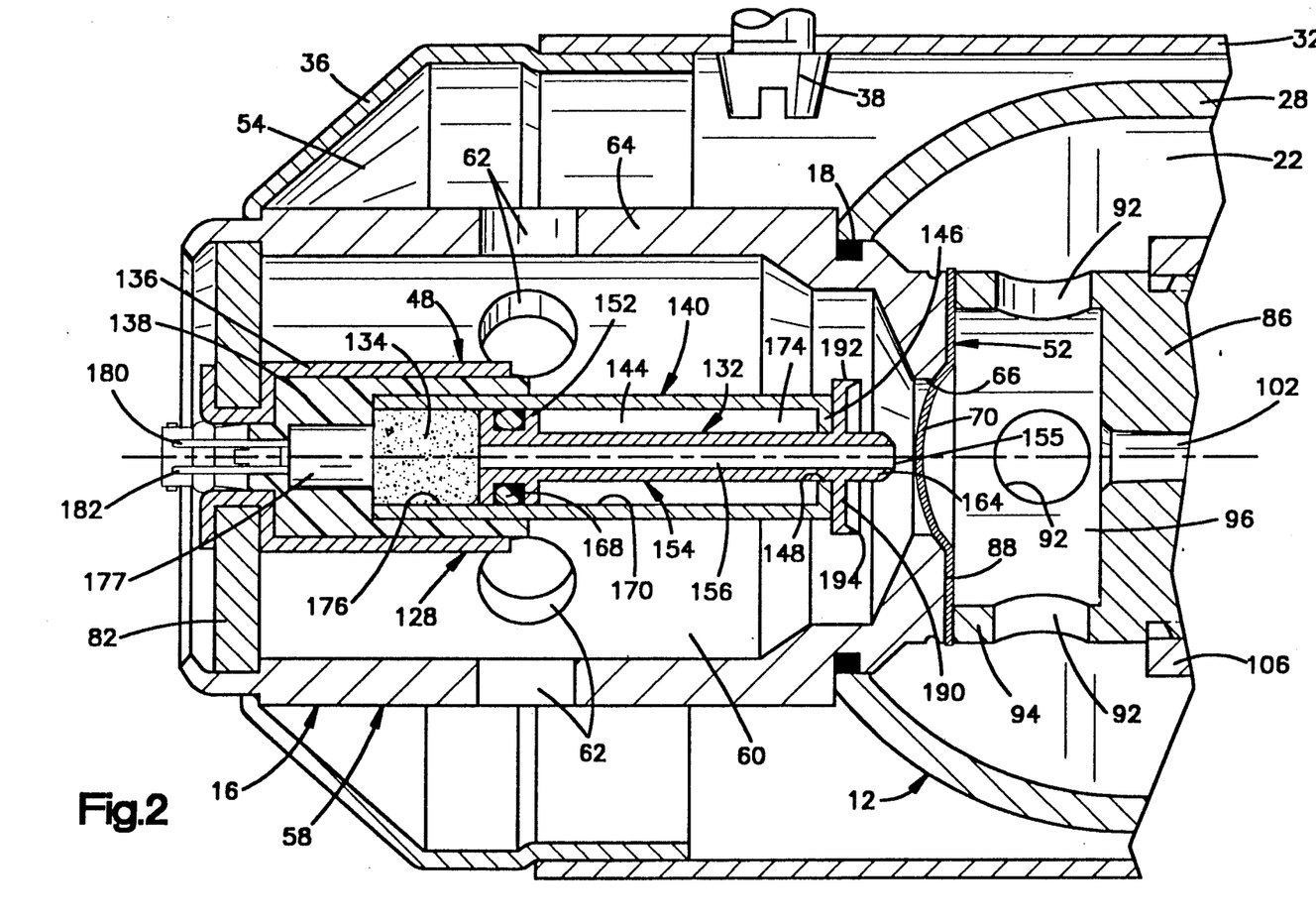
FIG. 2 is an enlarged fragmentary sectional view of a portion of the inflator of FIG. 1 showing parts in a retracad position.

The burst disk 52 extends across a circular opening 66 at the end of the manifold plug 58 which is presented to the interior of the container 12. The burst disk 52 is secured to the manifold plug 58 and blocks a flow of gas from the chamber 22 until the burst disk is ruptured by the actuator assembly 48. The burst disk 52 has a circular domed or bulged central portion 70.

The outer end of the manifold plug 58 (FIG. 2) is closed by a circular end wall 82. The actuator assembly 48 is mounted on the end wall 82. The end wall 82 supports the actuator assembly 48 with its longitudinal central axis coincident with central axes of the manifold plug cavity 60, the circular opening 66, and the burst disk 52. The diameter and length of the actuator assembly 48 are sufficiently smaller than the diameter and length of the cavity 60 so that gas can flow from the chamber 22 and through the cavity 60 to the openings 62 when the burst disk 52 is ruptured.

The manifold assembly 16 also includes a hollow cylindrical metal holder 86 which is coaxial with the manifold plug 58 and is disposed in the container 12. The holder 86 is tungsten inert gas (TIG) welded to the burst disk 52 and thus to the inner end of the manifold plug 58. The circular burst disk 52 has a flat annular rim portion 88 which extends between the inner end of the manifold plug 58 and the outer end of the holder 86. The manifold plug 58, holder 86 and rim portion 88 of the burst disk 52 are all tungsten inert gas welded together to form the unitary manifold assembly 16.

A plurality of circular inlet openings 92 (FIG. 2) are arranged in a circular array in a side wall 94 of the holder 86. The openings 92 provide fluid communication between the chamber 22 and a generally cylindrical cavity 96 in the holder 86. The burst disk 52 blocks fluid flow from the cavity 96 into the manifold plug 58 until the burst disk is ruptured by the actuator assembly 48.

The booster charge 44 (FIG. 1) is disposed in a cylindrical chamber 98 formed in the end of the holder 86 opposite the burst disk 52. Prior to operation of the actuator assembly 48, the chamber 98 is connected in fluid communication with the chamber 96 through a generally cylindrical opening 102. The chamber 98 and opening 102 are coaxial with the burst disk 52 and the actuator assembly 48. Although the opening 102 has a generally cylindrical configuration, the opening has a slight inward taper from a wide end portion adjacent to the cavity 96.

Ignitable Material

As noted above, the ignitable material 42 includes the booster charge 44 and the body 46 of pyrotechnic material which are disposed in a coaxial relationship (FIG. 1). The booster charge 44 is readily ignitable to ignite the body 46. The booster charge 44 is securely held in the chamber 98 and is enclosed by a thin covering of polymeric material which is destroyed upon burning of the booster charge. The ignitable material forming the booster charge 44 is preferably boron potassium nitrate ($BKNO_3$), but could have a different composition if desired.

Upon operation of the actuator assembly 48, the booster charge 44 is ignited through the central opening 102 in the holder 86. The booster charge 44 rapidly burns at a relatively high temperature to generate heat and flame which initiate burning of the body 46 of pyrotechnic material.

A generally cylindrical metal housing 106 encloses the body 46 of pyrotechnic material. One end of the housing 106 is disposed adjacent the holder 86 and has a threaded, interior circumferential surface. The threaded surface of the housing 106 engages a threaded, exterior circumferential surface on the holder 86 to mount the housing on the inner end of the holder. The housing 106 is coaxial with the chamber 98 and the booster charge 44 in the holder 86.

The body 46 of pyrotechnic material is disposed in a cylindrical chamber 108 within the housing 106 (FIG. 1). The body 46 of pyrotechnic material has a three-lobed cross sectional configuration. The lobes extend throughout the axial extent of the body. Straight cylindrical passages (not shown) extend parallel to each other and axially through respective lobes in the body 46. The lobes of the body 46 have an interference fit with a cylindrical inner side surface 112 (FIG. 1) of the housing 106 to support the body 46 firmly in the cylindrical housing chamber 108.

By providing the body 46 of pyrotechnic material with internal passages, the body 46 will have a slightly progressive burn characteristic. Specifically, as the pyrotechnic material forming the body 46 is burned, the rate of generation of heat and gas slightly increases. This is because, as the body 46 burns, the total surface area of the body which is burning increases slightly. The area of the outer side surface of the body 46 decreases while the area of the surfaces of the passages increases. The body 46 could be configured to have different burning characteristics if desired.

At its end opposite from the manifold assembly 16 (FIG. 1), the housing 106 is substantially closed except for a circular orifice 116. The orifice 116 is disposed in a coaxial relationship with the housing chamber 108 and the body 46 of pyrotechnic material. The chamber 108 within the housing 106 is connected by the orifice 116 in fluid communication with the chamber 22 in the container 12 (FIG. 1). The orifice 116 is continuously open so that the gas which is stored in the chamber 22 can flow into the housing chamber 108 around the body 46.

Disposed between the body 46 of pyrotechnic material and the orifice 116 are a flat baffle plate 118 (FIG. 1), a circular screen 122, and a flat circular orifice plate 120 through which an orifice (not shown) extends. During burning of the body 46, a flow of combustion products from the pyrotechnic material of the body 46 impinges against the baffle plate 118. The baffle plate 118 provides a tortuous path in the housing 106 for the combustion products, and thus some particles may be trapped in the housing. The combustion products, after they pass the baffle plate 118, flow through the screen 122 (FIG. 1), the orifice plate 120, and the housing orifice 116 into the chamber 22. Also, during burning of the body 46, a flame is conducted through the orifice plate 120 and housing orifice 116 into the chamber 22.

During initial burning of the body 46 of pyrotechnic material, an opening of relatively small area in the orifice plate 120 restricts the flow of combustion products from the housing chamber 108. This causes the pressure and temperature in the housing chamber 108 to increase in such a manner as to promote burning of the pyrotechnic material forming the body 46.

Although the body 46 of pyrotechnic material could have many different compositions, in one specific embodiment of the invention, the pyrotechnic material forming the body 46 had the following composition:

| % By Weight | Ingredient |
| --- | --- |
| 73% | Potassium perchlorate |
| 8.7% | Dioctyl adipate |
| 6.6% | Polyvinyl chloride |
| 0.05% | Carbon Black |
| 0.15% | Stabilizers (Boron, Chromium) |
| 11.5% | Potassium nitrate |

Also, the body 46 of pyrotechnic material could have different sizes and shapes. The size and shape of the body 46 is the same as is more fully described in U.S. Pat. No. 5,131,680 issued on Jul. 21, 1992, entitled "Inflator Assembly", and assigned to the assignee of the present application. The construction of the baffle plate 118, screen 122 and orifice plate 120 is also the same as is described in the aforementioned U.S. Pat. No. 5,131,680.

Actuator Assembly

The actuator assembly 48 (FIG. 2) is operable to rupture the burst disk 52 and to ignite the booster charge 44. The actuator assembly 48 includes a cylindrical housing 128 in which a piston 132 and a pyrotechnic charge 134 of ignitable material are disposed in a coaxial relationship. The housing 128 includes a generally cylindrical metal outer housing member 136, a cylindrical casing 138, and an inner housing member 140. The outer housing member 136 is secured to the end wall 82 of the manifold plug 58 and is disposed in a coaxial relationship with the burst disk 52, the booster charge 44 and the body 46 of pyrotechnic material. The casing 138 is disposed within the outer housing member 136 and extends around the cylindrical metal inner housing member 140. The casing 138 electrically insulates the metal inner housing member 140 from the metal outer housing member 136. As shown, the casing 138 is formed of glass reinforced nylon. However, the casing 138 may be made of a variety of engineered resins.

The inner housing member 140 forms a cylinder chamber 144 in which the piston 132 and the pyrotechnic charge 134 are disposed. The inner housing member 140 has an annular end flange 146 which defines a circular opening 148 to the cylinder chamber 144. The piston 132 is formed from a single piece of metal and has a cylindrical head end portion 152. A smaller-diameter cylindrical piston rod 154 extends axially away from the head end portion 152. A cylindrical central passage 156 is coaxial with and extends through the head end portion 152 and piston rod 154 of the piston 132.

The cylindrical piston rod 154 has a pointed tip 155 at its outer central end portion 164 which extends through the opening 148. The piston rod 154 also has an annular flange portion 190 extending radially outward from the outer central end portion 164 of the piston rod 154. The annular flange portion 190 has an axially extending, annular, pointed tip 194 at its outer edge 192.

An annular 0-ring 168 is disposed on the head end portion 152 of the piston 132 and engages and seals against a cylindrical inner side surface 170 of the inner housing member 140. Together, the head end portion 152 and the O-ring 168 cooperate to divide the cylindrical chamber 144 into a rod end portion 174 and a head end portion 176.

The pyrotechnic charge 134 is disposed in the head end portion 176 of the cylinder chamber 144. A squib 177 is located adjacent the pyrotechnic charge 134. Two electrically conductive pins 180 and 182 are connected with the squib 177. The pins 180 and 182 extend through the casing 138, and through an opening in the end of the outer housing member 136 adjacent the wall 82. The pins 180 and 182 provide a path for electrical current to actuate the squib 177.

Although the pyrotechnic charge 134 could have many different compositions, in one specific embodiment of the invention, the pyrotechnic charge had the following composition:

| % By Weight | Ingredient |
| --- | --- |
| 72% | Boron potassium nitrate (BKNO$_3$) |
| 14% | Titanium hydride |
| 14% | Potassium perchlorate |

Operation

Upon the occurrence of sudden vehicle deceleration, a deceleration sensor (not shown) of known construction completes an electrical circuit to permit electrical current to flow to the pins 180 and 182 of the actuator assembly 48. The electrical current transmitted to the pins 180 and 182 causes the squib 177 to ignite the pyrotechnic charge 134. The hot combustion products generated by burning of the pyrotechnic charge 134 push against the head end portion 152 of the piston 132 to move the piston in the cylinder chamber 144 from a position shown in FIG. 2 to a position shown in FIG. 3.

Figure 3:
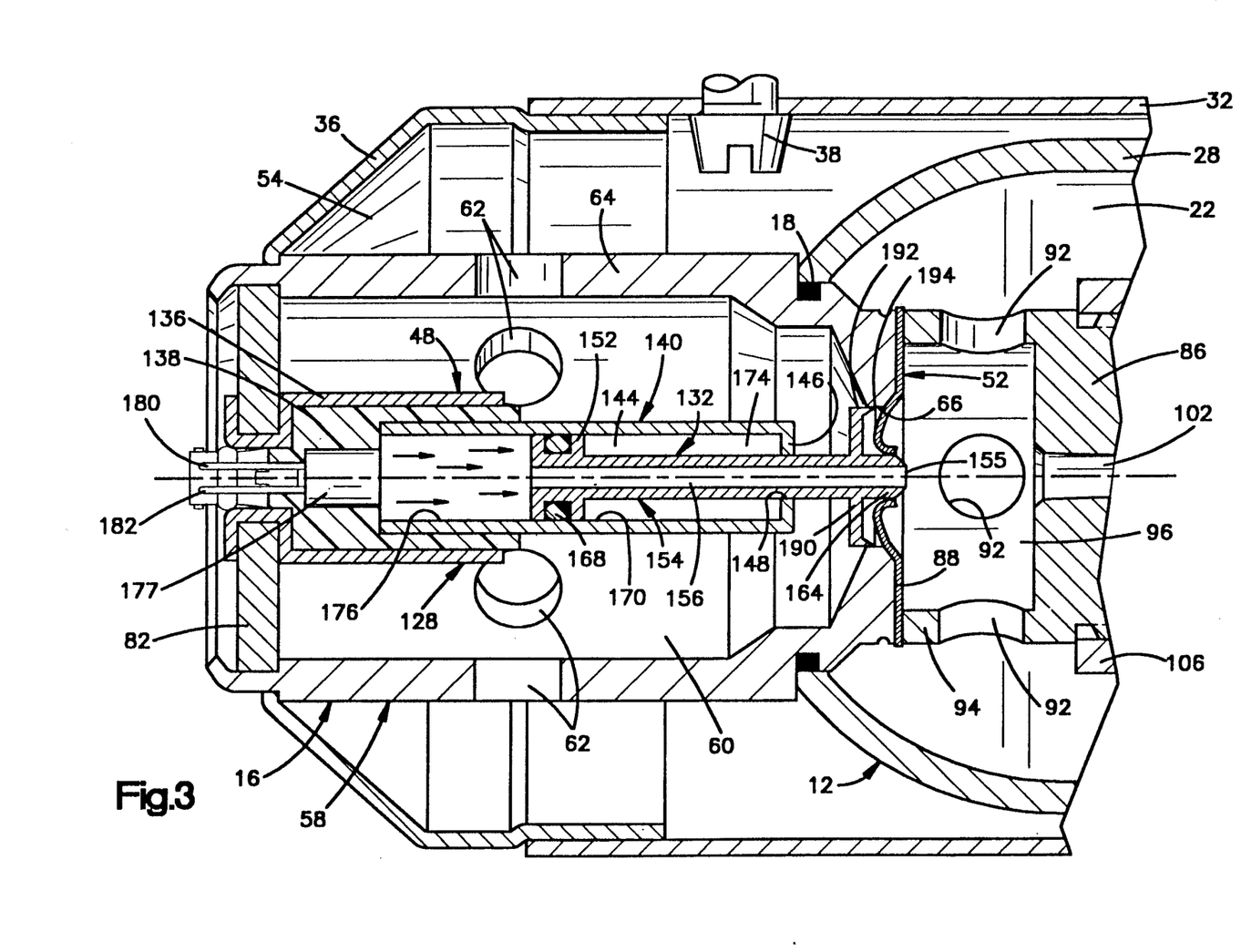
FIGS. 3-5 are views similar to FIG. 2 but showing parts in other positions.

As the piston 132 moves from the position shown in FIG. 2 to the position shown in FIG. 3, the piston rod 154 moves through the circular opening 148. The pointed tip 155 of the outer central end portion 164 of the piston rod 154 of the piston 132 strikes at or near the center of the burst disk 52. The force applied against the burst disk 52 by the pointed tip 155 on the piston rod 154 punctures the burst disk 52.

Figure 4:
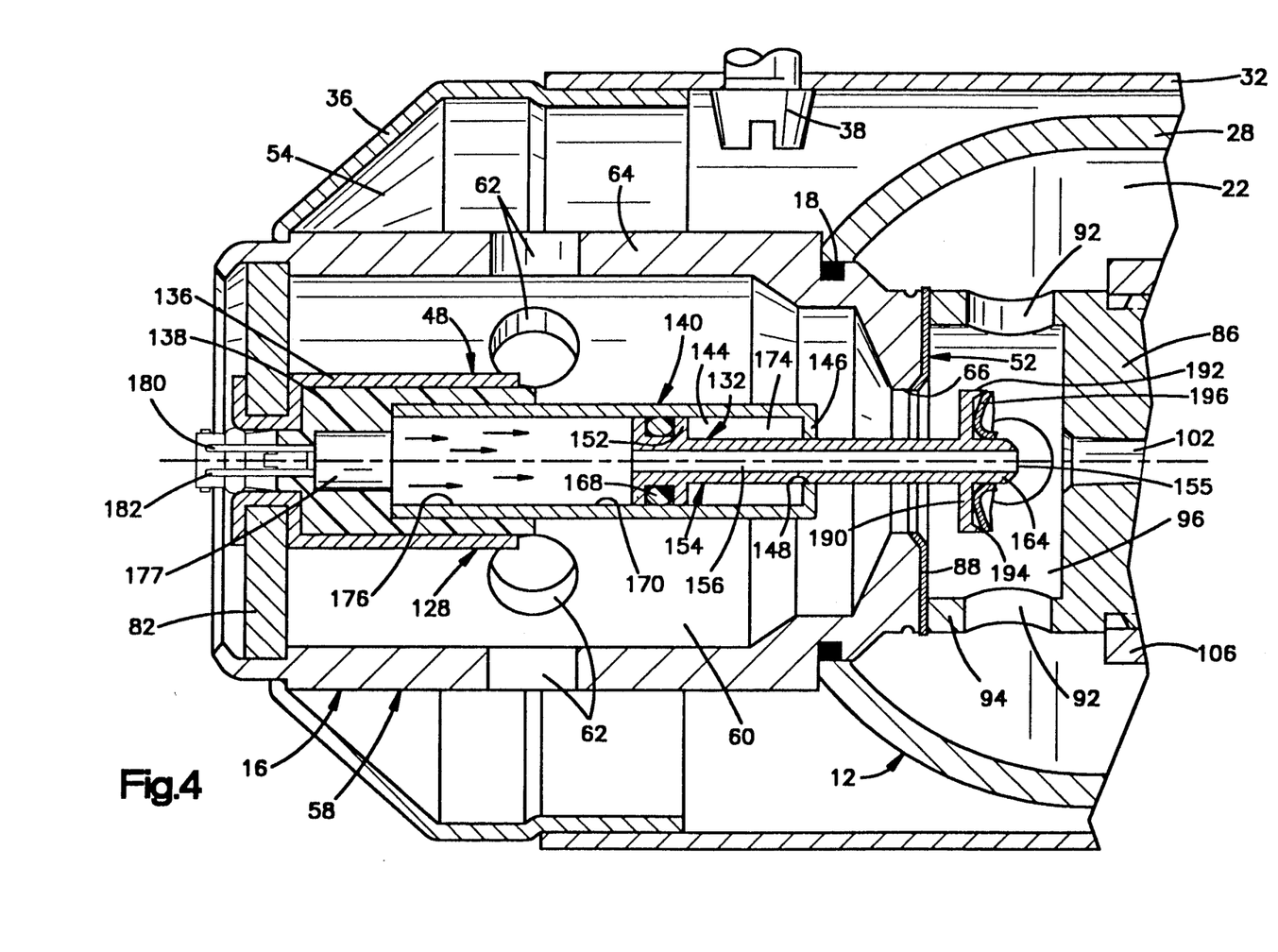

The piston 132 then continues to move from the position shown in FIG. 3 to the position shown in FIG. 4. When the piston 132 moves from the position shown in FIG. 3 to the position shown in FIG. 4, the annular pointed tip 194 at the outer edge 192 of the flange portion 190 cuts out a portion 196 (FIG. 4) of the burst disk 52 to form an opening in the burst disk 52. As will be apparent, the diameter of the tip 194 determines the diameter, and thus the effective flow area, of the opening formed in the burst disk 52. The cut portion 196 of the burst disk 52 has a generally circular shape and lies against the annular flange portion 190 of the piston rod 154 and the outer central end portion 164 of the piston rod 154, as shown in FIG. 3.

Figure 5:
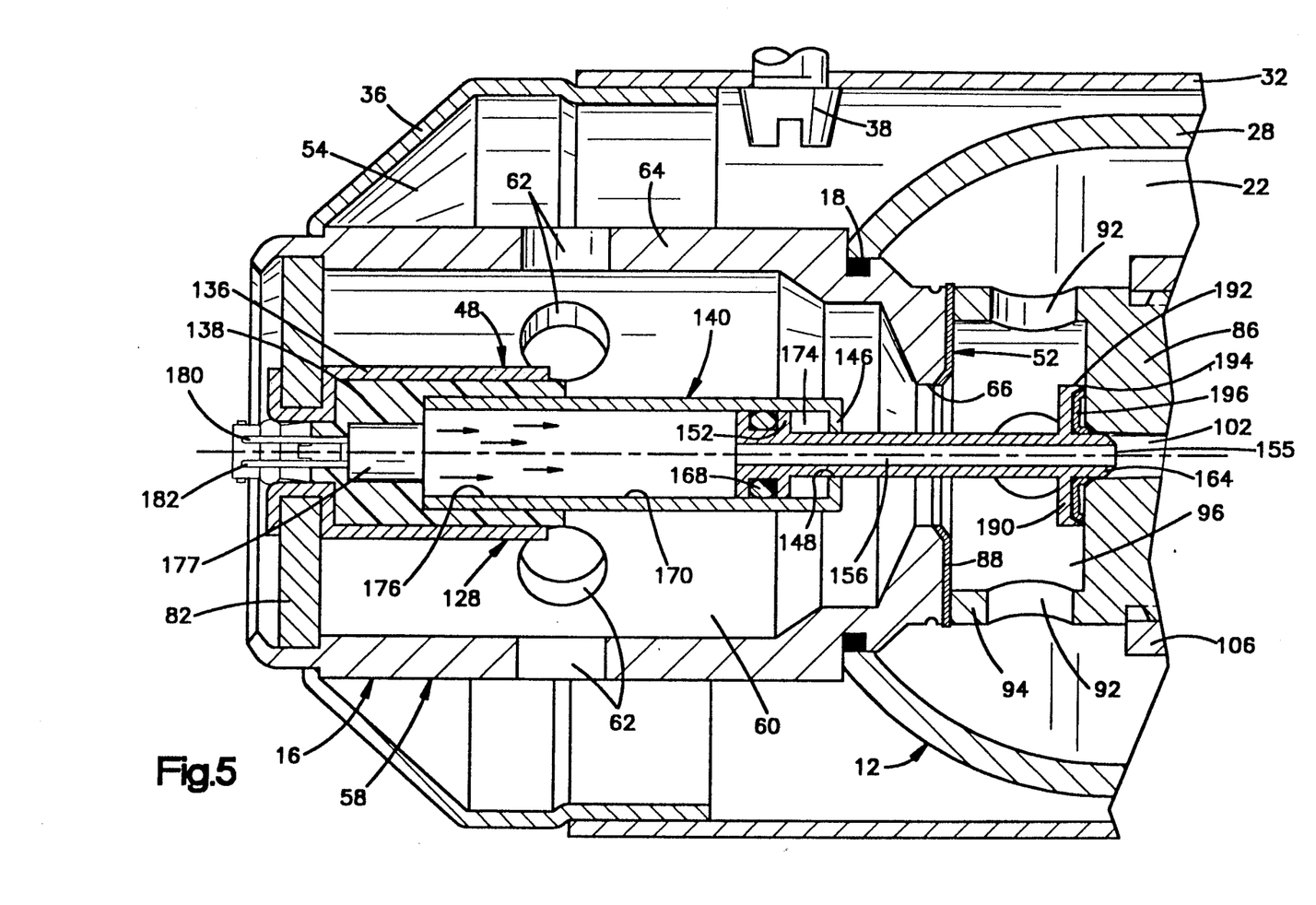

The piston 132 continues to move from the position shown in FIG. 4 to the position shown in FIG. 5. As the piston 132 moves from the position shown in FIG. 4 to the position shown in FIG. 5, the cut portion 196 of the burst disk 52 is carried by the piston rod 154. The cut portion 196 of the burst disk 52 is carried by the piston rod 15 until the cut portion 196 is clamped between the holder 86 and the annular flange portion 190.

Upon rupturing of the burst disk 52 as the piston 132 moves from the position shown in FIG. 2 to the position shown in FIG. 5, the gas in the container chamber 22 flows from the chamber through the manifold inlet openings 92 to the chamber 96 in the holder 94. The gas then flows through the opening formed in the burst disk 52 around the piston rod 154 of the piston 132, and into the cavity 60 in the manifold plug 58. From the manifold plug cavity 60, the gas flows through the openings 62 into the diffuser chamber 54. The gas flows from the diffuser chamber 54 through the openings 56 (FIG. 1) to an air bag.

The piston 132 moves axially under the influence of combustion products resulting from burning of the pyrotechnic charge 134. The outer central end portion 164 of the piston rod 154 moves into the generally cylindrical opening 102 in the holder 86 so that the piston rod and the holder are in a telescopic relationship. Hot combustion products resulting from burning of the pyrotechnic charge 134 are conducted through the piston passage 156 into the opening 102 in the holder 86. The hot combustion products flow and impinge against the leftward (as viewed in FIG. 3) end portion of the booster charge 44 and ignite the booster charge 44.

Upon ignition of the booster charge 44, the booster charge burns at a relatively high temperature to generate heat and flame which are directed toward the body 46 of pyrotechnic material. The heat and flame from burning the booster charge 44 are effective to ignite the body 46 of pyrotechnic material.

As the body 46 of pyrotechnic material begins to burn, hot combustion products and flame flow around the baffle plate 118 (FIG. 1), through the screen 122, through the orifice plate 120, and through the housing orifice 116 into the chamber 22 containing the stored gas. During burning of the body 46 of pyrotechnic material, the temperature in the chamber 108 reaches approximately 4,000° F. This relatively high temperature is more than sufficient to enable the hot combustion products and flame to melt the orifice plate 120 partially and increase the diameter of the orifice in the plate to the same diameter as the housing orifice 116.

The flame and hot combustion products heat the gas in the chamber 22. Also, gas generated by burning the body 46 of pyrotechnic material supplements the stored gas in the chamber 22. As the gas in the chamber 22 is heated, fluid pressure in the chamber increases. This results in an increased rate of flow of gas through the manifold assembly 16 to the diffuser 14 and from the diffuser into the inflatable occupant restraint.

In one specific embodiment of the invention, prior to operation of the actuator assembly 48, the fluid pressure in the chamber 22 was approximately 3,000 psi. Upon puncturing of the burst disk 52 by movement of the piston 132 from the position shown in FIG. 2 to the position shown in FIG. 3, a flow of unheated gas from the chamber 22 caused the fluid pressure in the container 12 to decrease to approximately 2,500 psi. Ignition of the booster charge 44 and burning of the body 46 of pyrotechnic material resulted in the gas in the chamber 22 being heated to increase the pressure in the chamber to about 6,000 psi. Thus, the burning of the pyrotechnic material forming the body 46 was sufficient to cause the fluid pressure in the chamber 22 to increase substantially from its original pressure even though a portion of the gas had been released from the chamber. This resulted in a relatively large flow of gas to expand the occupant restraint.

The piston 132 moves quickly from the position of FIG. 2 to the position of FIG. 5. When the piston reaches the position of FIG. 5, there may be a tendency for the piston to rebound back toward the position of FIG. 2. In order to prevent this from occurring, the generally cylindrical opening 102 has a slight axial taper converging in a direction toward the booster charge 44. As the outer end portion 164 of the piston rod 154 moves into the opening 102, the axially tapering surfaces that define the opening 102 engage the outer end portion 164 of the piston rod 154 and block further axial movement of the piston. Therefore, even though the head end portion 152 of the piston 132 is spaced from the end flange 146 of the inner housing member 140 of the actuator assembly 48, the piston 132 is blocked against further rightward (as viewed in FIG. 5) movement by the axially tapering side wall surfaces around the opening 102. In addition, the axially tapered side wall surfaces grip the outer central end portion 164 of the piston rod 154 to hold the piston 132 firmly in the position of FIG. 5.

Although the present invention has been described hereinabove as embodied in the inflator 10 including the booster charge 44, it is contemplated that the present invention may be embodied in any other type of inflator including inflators without any booster charge. The present invention may be embodied in any inflator which includes a rupturable burst disk or any other type of rupturable diaphragm.

From the above description of the invention, those skilled in the art to which the present invention relates will perceive improvements, changes and modifications. Such improvements, changes and modifications within the skill of the art to which the present invention relates are intended to be covered by the appended claims.

Having described the invention, the following is claimed:

1. An inflator for inflating an inflatable vehicle occupant restraint, said inflator comprising:
   a source of gas for inflating the vehicle occupant restraint;
   means for directing gas into the vehicle occupant restraint;
   a burst disk located to block gas flow through said directing means;
   a piston for rupturing said burst disk, said piston being movable from a first position to a second position to rupture said burst disk; and
   means for moving said piston from said first position to said second position;
   said piston including (i) a first central portion for puncturing said burst disk and (ii) a second portion for cutting out a portion of said burst disk after said first central portion punctures said burst disk.

2. An inflator according to claim 1 wherein said first position is a retracted position of said piston and said second position is an extended position of said piston.

3. An inflator according to claim 1 wherein said first central portion of said piston punctures said burst disk at a location central of said burst disk and said second portion of said piston cuts said burst disk around the central location of said burst disk.

4. An inflator according to claim 1 wherein said means for moving said piston includes an igniter assembly containing an ignitable material.

5. An inflator according to claim 1 wherein said piston includes means for carrying said cut out portion of said burst disk as said piston moves after said second portion of said piston cuts out said portion of said burst disk.

6. An inflator according to claim 5 further including means against which said cut out portion of said burst disk is clamped by said piston.

7. An inflator for inflating an inflatable vehicle occupant restraint, said inflator comprising:
   container means for storing gas under pressure;
   means for directing gas from said container means into the vehicle occupant restraint;
   said container means including a burst disk located to block gas flow through said directing means
   a piston for rupturing said burst disk to release the gas from said container means and to thereby enable the gas to flow through said directing means into the vehicle occupant restraint, said piston being movable from a first position to a second position to rupture said burst disk, said piston including (i) a first central portion for puncturing said burst disk and (ii) a second portion for cutting out a portion of said burst disk after said first central portion punctures said burst disk;
   means for moving said piston from said first position to said second position; and
   an ignitable material for, when ignited, generating heat to heat the gas in said container means, said ignitable material igniting when said piston moves from said first position to said second position.

8. An inflator according to claim 7 wherein said first central portion of said piston punctures said burst disk at a location central of said burst disk and said second portion of said piston cuts said burst disk around the central location of said burst disk.

9. An inflator according to claim 7 wherein said means for moving said piston includes an ignitable material.

10. An inflator according to claim 7 wherein said piston includes means for carrying said cut out portion of said burst disk as said piston moves after said second portion of said piston cuts out said portion of said burst disk.

11. An inflator according to claim 10 further including means against which said cut out portion of said burst disk is clamped by said piston.

* * * * *